United States Patent
Bueb et al.

(10) Patent No.: US 11,886,740 B2
(45) Date of Patent: Jan. 30, 2024

(54) COMMAND PRIORITIZATION TECHNIQUES FOR REDUCING LATENCY IN A MEMORY SYSTEM

(71) Applicant: Micron Technology, Inc., Boise, ID (US)

(72) Inventors: Christopher Joseph Bueb, Folsom, CA (US); Olivier Duval, Pacifica, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/457,202

(22) Filed: Dec. 1, 2021

(65) Prior Publication Data
US 2023/0176776 A1      Jun. 8, 2023

(51) Int. Cl.
*G06F 3/06*      (2006.01)
*G06F 9/455*     (2018.01)

(52) U.S. Cl.
CPC .......... *G06F 3/0659* (2013.01); *G06F 3/0613* (2013.01); *G06F 3/0664* (2013.01); *G06F 3/0673* (2013.01); *G06F 9/45558* (2013.01); G06F 2009/45583 (2013.01)

(58) Field of Classification Search
CPC .... G06F 3/0659; G06F 3/0613; G06F 3/0664; G06F 3/0673; G06F 9/45558; G06F 2009/45583
See application file for complete search history.

(56) References Cited

U.S. PATENT DOCUMENTS

2018/0101319 A1* 4/2018 Zhou ................. G06F 5/065
2021/0223994 A1* 7/2021 Kanno ............... G06F 3/0679

* cited by examiner

*Primary Examiner* — Edward J Dudek, Jr.
(74) *Attorney, Agent, or Firm* — Holland & Hart LLP

(57) ABSTRACT

Methods, systems, and devices for command prioritization techniques for reducing latency in a memory system are described. In some examples, a host system may receive a set of commands from one or more virtual machines to access a common memory system. The host system may store the set of command in a command queue associated with the memory system and arrange the set of command according to order that is based on one or more identified pattern of accessing sequential addresses in the set of commands. The host system may transmit the set of command to the memory system based on the order and the memory system may execute the commands according to the order.

25 Claims, 8 Drawing Sheets

COMMAND PRIORITIZATION TECHNIQUES FOR REDUCING LATENCY IN A MEMORY SYSTEM

FIELD OF TECHNOLOGY

The following relates generally to one or more systems for memory and more specifically to command prioritization techniques for reducing latency in a memory system.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
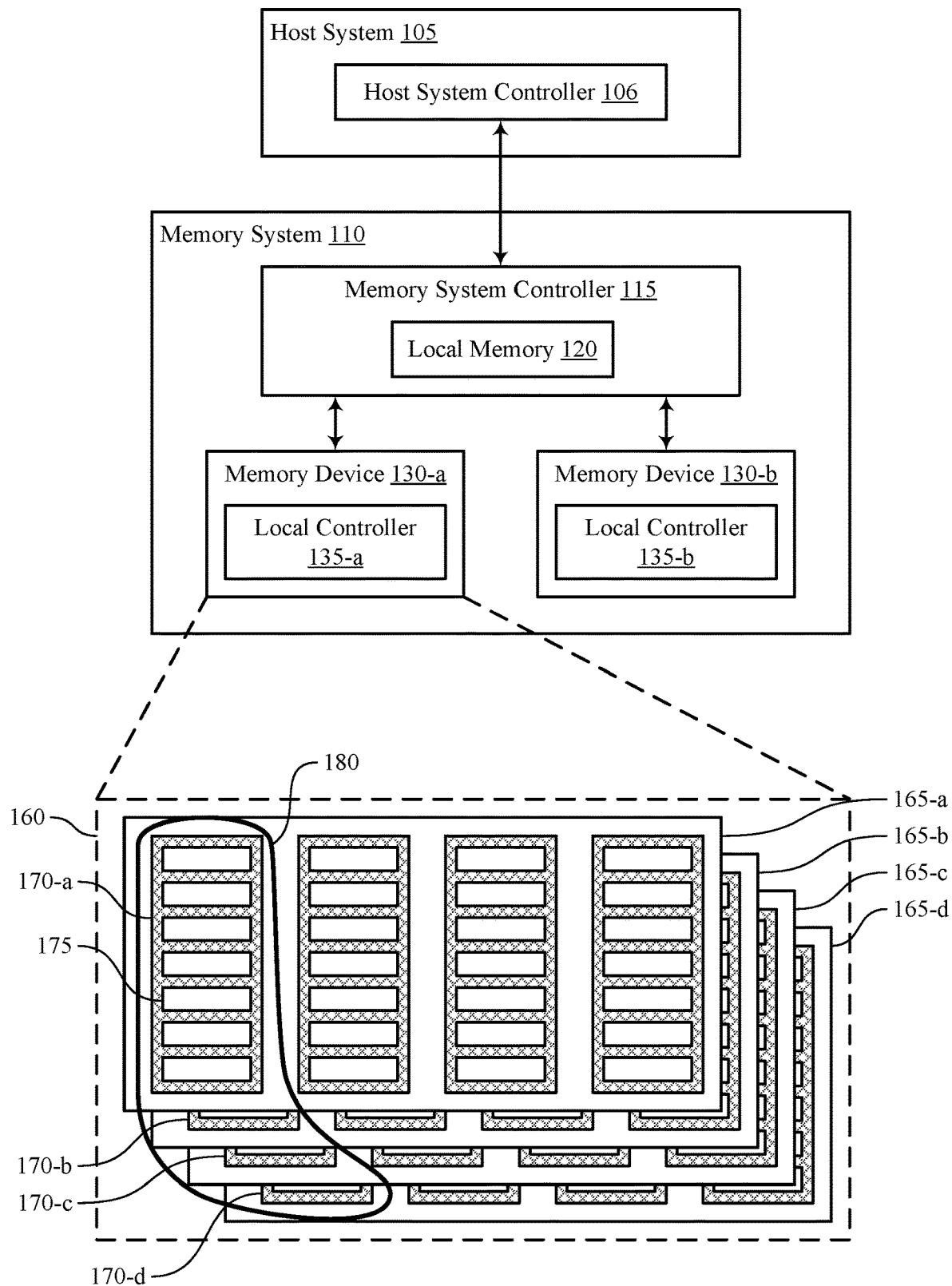
FIG. 1 illustrates an example of a system that supports command prioritization techniques for reducing latency in a memory system in accordance with examples as disclosed herein.

Some systems may include many virtual machines accessing and sharing a common memory system. That is, the two or more virtual machine may read or write data from the same array of memory cells included in the memory system. Situated between the two or more virtual machines and the memory system may be a host system, which may be an example of a hypervisor. The host system may facilitate communication between the two or more virtual machines and the memory system. As one example, the two or more virtual machines may transmit commands (e.g., read or write commands) to the host system and the host system may relay these commands to the memory system. The host system may store the commands received from the two or more virtual machines in a command queue and transmit the commands to the memory system according to the command queue. The order in which the host system stores the commands in the command queue may be on a first come, first served basis. That is, the commands in the command queue are ordered based on a time of arrival at the host system. The earlier the command arrives at the host system, the higher priority the command may have in the command queue.

When the memory system executes a command received from the host system, the memory system may first convert a logical address included in the command to a physical address by looking at a logical-to-physical (L2P) mapping, which may be referred to as a L2P table. In some examples, the L2P mapping may be split into different portions, where a single portion of the L2P mapping may be stored at a controller of the memory system and the remaining portions of the L2P mapping may be stored at the memory array of the memory system. If the L2P mapping portion stored at the controller does not include the logical address of the command being executed, the controller may swap the L2P mapping portion with an L2P mapping portion that includes the logical address which is stored at the memory array. The process of transferring L2P mapping portions between a volatile memory device associated with the controller and a non-volatile memory device may be somewhat time consuming and as such, performing a large number of L2P mapping transfers may introduce latency into the system and decrease performance of the system.

As described herein, the host system may prioritize commands in the command queue to reduce L2P mapping transfers. In some examples, the host system may receive the commands from the two or more virtual machines and evaluate whether two or more of the commands correspond to the same L2P mapping portion. As one example, the host system may compare one or more parameters of a first command to one or more parameters of a second command. The one or more parameters may include one or both of a block size and a block number. Commands that have similar parameters may belong to the same L2P mapping portion. As such, if the one or more parameters of the first command are within range of the one or more parameters of the second command, the host system may group the first command and the second command together in the command queue.

In another example, the host system may determine a mapping between a set of logical address ranges and a set of identifiers (IDs). That is, each ID in the set may correspond to a different logical address range. The host system may utilize the mapping to determine an ID for each of a first command and a second command based on the mapping. Matching IDs between commands may indicate that the commands belong to the same L2P table portion. As such, if the ID for the first command matches the ID for the second command, the host system may group the first command together with the second command in the command queue. Grouping the first command and the second command together may ensure that the memory system executes the first command and the second command within a short time interval (e.g., time interval below a threshold) and because the first command and the second command may belong to the same L2P mapping portion, the memory system may not perform an L2P table swap between executing those commands. The method as described herein may allow a memory system to perform less L2P mapping transfers when compared to other methods, which may decrease latency of the system and increase the efficiency of the system.

Figure 2:
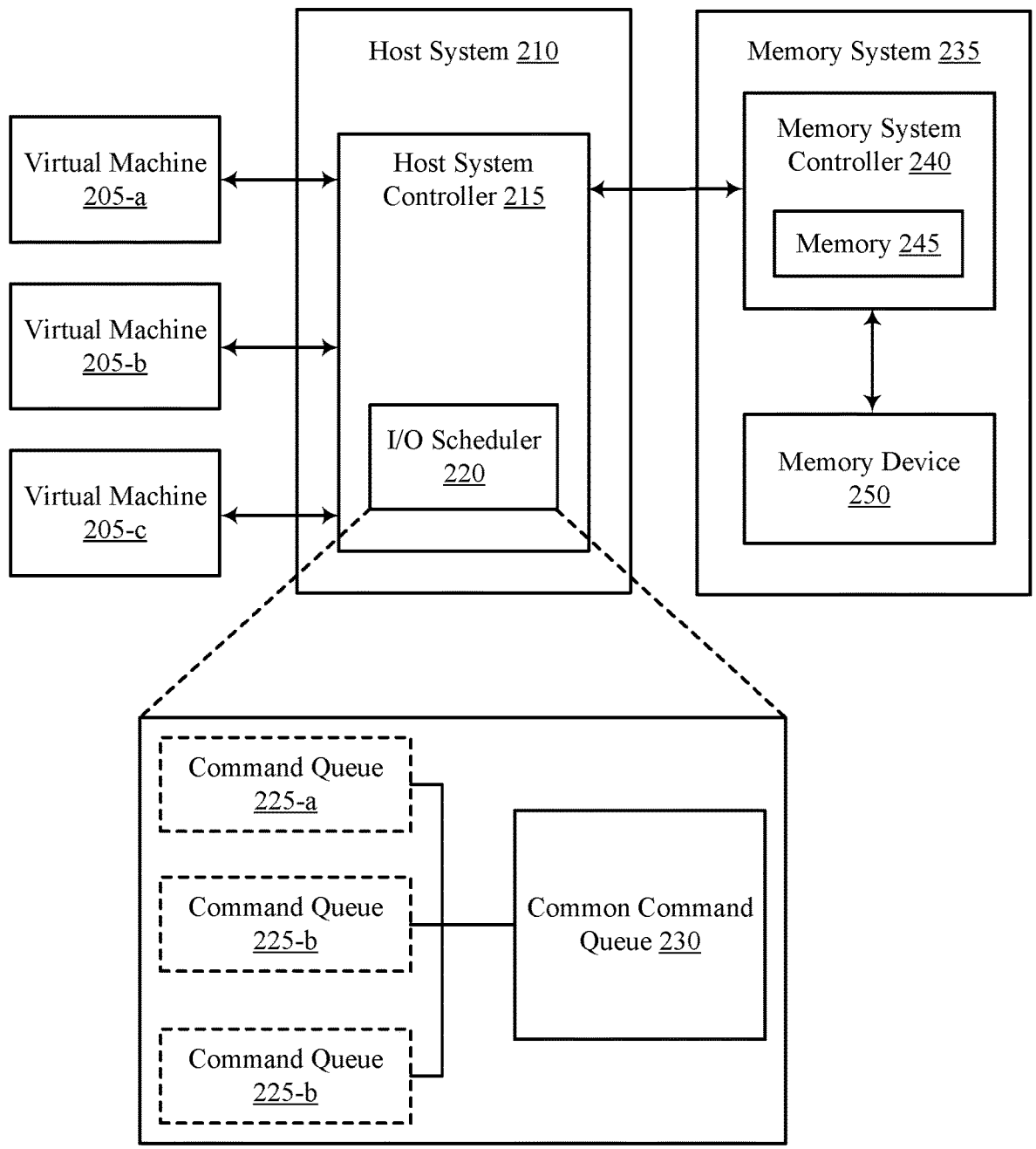
FIG. 2 illustrates an example of a system that supports command prioritization techniques for reducing latency in a memory system in accordance with examples as disclosed herein.

Features of the disclosure are initially described in the context of systems, devices, and circuits with reference to FIGS. 1 and 2. Features of the disclosure are described in the context of a command queue arrangement, a mapping, and a process flow with reference to FIGS. 3A, 3B, and 4. These and other features of the disclosure are further illustrated by and described in the context of an apparatus diagram and flowchart that relate to command prioritization techniques for reducing latency in a memory system with reference to FIGS. 5-8.

FIG. 1 illustrates an example of a system 100 that supports command prioritization techniques for reducing latency in a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a L2P mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support command prioritization techniques for reducing latency in a memory system. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

As described herein, the host system 105 (e.g., which may be an example of a hypervisor) may identify patterns of accessing sequential addresses and arrange a command queue associated with the memory system 110 based on the patterns. In some examples, the memory system 110 may be an example of centralized storage and as such, may be accessed by multiple virtual machines (not shown). To manage how the multiple virtual machines interact with the memory system 110, the host system 105 may be implemented. The host system 105 may interleave commands from the multiple virtual machines and convey these commands to the memory system 110. For example, the host system 105 may receive a set of commands from the multiple virtual machines. Upon receiving the set of commands, the host system 105 may identify one or more patterns of accessing sequential addresses within the set of commands. That is, the host system 105 may identity commands within the set that are associated with a same portion of an L2P table.

In one example, the host system 105 may compare parameters (e.g., a block size or a block number) of different commands of the set of commands to determine which commands of the set are associated with a same L2P table portion. As another example, the host system 105 may examine relationships between logical address ranges of different commands of the set to determine which commands of the set are associated with a same L2P table portion. The host system 105 may arrange the set of commands in a command queue according to an order such that the commands that are associated with the same L2P table portion are grouped together and may transmit the set of commands to the memory system 110 according to the order. Using the methods as described herein, a memory system 110 may perform less L2P table swaps when compared to other methods which may increase efficiency of the system and decrease latency in accessing memory.

FIG. 2 illustrates an example of a system 200 that supports command prioritization techniques for reducing latency in a memory system in accordance with examples as disclosed herein. In some examples, the system 200 may implement aspects of the system 100. For example, the system 200 may include a host system 210 and a memory system 235 which may be examples of a host system 105 and a memory system 110 as described with reference to FIG. 1. The host system 210 may be an example of a hypervisor.

In some examples, the memory system 235 may be common to one or more virtual machines 205. For example, the memory system 235 may be shared by a virtual machine 205-*a*, a virtual machine 205-*b*, and a virtual machine 205-*b*. As such, any one of the virtual machines 205 may access (e.g., read or write) a memory device 250 of the memory system 235, where the memory device 250 may include an array of memory cells. In some examples, the virtual machines 205 may be part of a larger system. For example, a vehicle may include different sub-systems which may run on different virtual machines 205. A virtual machine may be an example of a compute resource that uses software instead of a hardware (directly) to run programs and deploy applications. Said another way, a virtual machine may be example of software-defined computing device within a larger system.

In some examples, a host system 210 may facilitate communication between the virtual machines 205 and the memory system 235. For example, the host system 210 may interleave commands (e.g., read commands or write commands) received from the virtual machines 205 and transmit the interleaved commands to the memory system 235 such that the memory system 235 may interpret the commands as random reads or random writes (e.g., as opposed to commands associated with a particular virtual machine 205). As one example, the host system 210 may arrange the commands in a command queue according to an order in which the commands were received from the virtual machines 205 (e.g., on a first come, first served basis).

The memory system 235 may receive the commands from the host system 210 and execute the commands according to the order. Before executing a command (e.g., performing a read operation or a write operation as specified by the command), the memory system controller 240 may first convert a logical address included in the command to a physical address. The logical address is a virtual address that does not exist physically. As such, in order to access data as requested by the command, the memory system controller 240 may convert the logical address to the physical address which identifies a physical location of the data in the memory device 250.

In some examples, the memory system controller 240 may utilize an L2P mapping to convert the logical address to the physical address. The L2P mapping may include a mapping between logical addresses and physical addresses. But memory 245 of the memory system controller 240 may be unable to store the full L2P mapping (e.g., table that includes the logical address to physical address mappings). The memory 245 may be an example of SRAM or local memory 120 described with reference to FIG. 1. As such, the memory system controller 240 may store a portion of the L2P mapping (e.g., portion of the logical address to physical address mapping) at the memory 245 and the remaining portions of the L2P mapping may be stored at the memory device 250, which may be an example of a non-volatile memory device. If the portion of the L2P mapping stored at the memory 245 does not include the logical address to physical address mapping used for the command, the memory system controller 240 may swap the portion of the L2P mapping with a portion of the L2P mapping stored at the memory device 250. Because the host system 210 interleaves commands from the virtual machines 205, it is less likely that consecutive commands are associated with the same portion of the L2P mapping (e.g., are accessing adjacent memory location). Thus, the memory system 110 may perform multiple mapping swaps when executing the commands which may introduce latency into the system.

As described herein, the host system 210 may impose command prioritization to reduce L2P mapping swaps. In some examples, a host system controller 215 may include an I/O scheduler 220. The Input/Output (I/O) scheduler 220 may analyze commands from the virtual machines 205 and create a single dispatch command queue including the commands to dispatch to the memory system 235. Using the methods as described herein, the I/O scheduler 220 may additionally implement an algorithm to arrange the commands in the dispatch queue in such a way as to reduce L2P mapping swaps at the memory system 235.

In some examples, the host system controller 215 may receive a set of commands from the virtual machines 205 in the form of command queues 225, where each command queue 225 corresponds to a different virtual machine 205. For example, the host system controller 215 may receive a command queue 225-a associated with the virtual machine 205-a, a command queue 225-b associated with a virtual machine 205-b, and a command queue 225-c associated with a virtual machine 205-c. The I/O scheduler 220 may then store the set of commands of the command queues 225 in a common command queue 230 (e.g., a dispatch queue). As another example, the host system controller 215 may receive each command of the set of commands from the virtual machines 205 and may store the commands in the common command queue 230 as they are received (e.g., as opposed to receiving command queues 225 including multiple commands).

Once the host system controller 215 receives the set of commands from the virtual machines 205, the I/O scheduler 220 may identify one or more patterns of accessing sequential addresses within the set of commands. In some examples, the I/O scheduler may determine one or more parameters associated with each of the commands. The one or more parameters may be element fields included in a buffer head attached to a respective command. The buffer head may provide information related to the respective command. For example, the buffer head may include elements fields: block number, block size, buffer data, block device, etc. The block number element field indicates a starting logical block address of the command, the block size element field indicates a size of data being accessed using the command, the buffer data element field points to the data in a page, and the block device element field points to the physical block storage media device storing the data.

In one example, once the I/O scheduler determines the one or more parameters of each of commands of the set, the I/O scheduler may compare the one or more parameters across the set of commands. For example, the I/O scheduler may compare one or both of a block size or a block number of a first command of the set with one or more of a block size or a block number of a second command of the set. If the block size of the first command is within a range of the block size of the second command and/or if the block number of the first command is within a range of the block number of the second command, the I/O scheduler 220 may assume that the first command and the second command are collocated (e.g., associated with the same portion of the L2P mapping). Alternatively, if the block size of the first command is not within a range of the block size of the second command and/or if the block number of the first command is not within a range of the block number of the second command, the I/O scheduler 220 may determine that the first command and the second command are not collocated (e.g., are not associated with the same portion of the L2P mapping).

In another example, the I/O scheduler 220 may obtain a set of IDs, where each ID corresponds to a logical address range (e.g., LBA range) of a subset of a set of logical address ranges of the memory device 250. The logical address ranges corresponding to the set of IDs may not overlap one another. The I/O scheduler 220 may use the one or more parameters (e.g., the block number and the block size) to determine a logical block address range of each of the commands of the set and identify one or more IDs for each command. For example, a first ID may correspond to a first logical address range, a second ID may correspond to a second logical address range, and a third ID may correspond to third address range. The I/O scheduler 220 may determine that a logical address range of a first command of the set falls within the first logical address range and map the first ID to the first command. The I/O scheduler 220 may compare the IDs of the commands to each other. Commands that have matching IDs may be collocated, whereas commands that do not have matching IDs may not be collocated. In some examples, the I/O scheduler may update the set of IDs and corresponding logical address ranges based on the actual behavior of the memory system 235 when executing the set of commands, which is described in further detail with reference to FIGS. 3A and 3B.

The I/O scheduler 220 may arrange the set of commands in the common command queue 230 such that collocated commands are grouped together (e.g., follow one another in the common command queue 230). The I/O scheduler 220 may dispatch the common command queue 230 to the memory system 235 and the memory system controller 240 may execute the set of commands according to the order of the common command queue 230. Using the methods as described herein may allow the memory system 235 to execute commands that are associated with the same L2P mapping portion consecutively which may decrease L2P mapping swaps when compared to other methods. Reducing L2P mapping transfers may reduce the time it takes for the memory system 235 to execute the set of commands and therefore increase the efficiency of accessing the memory system.

Figure 3A:
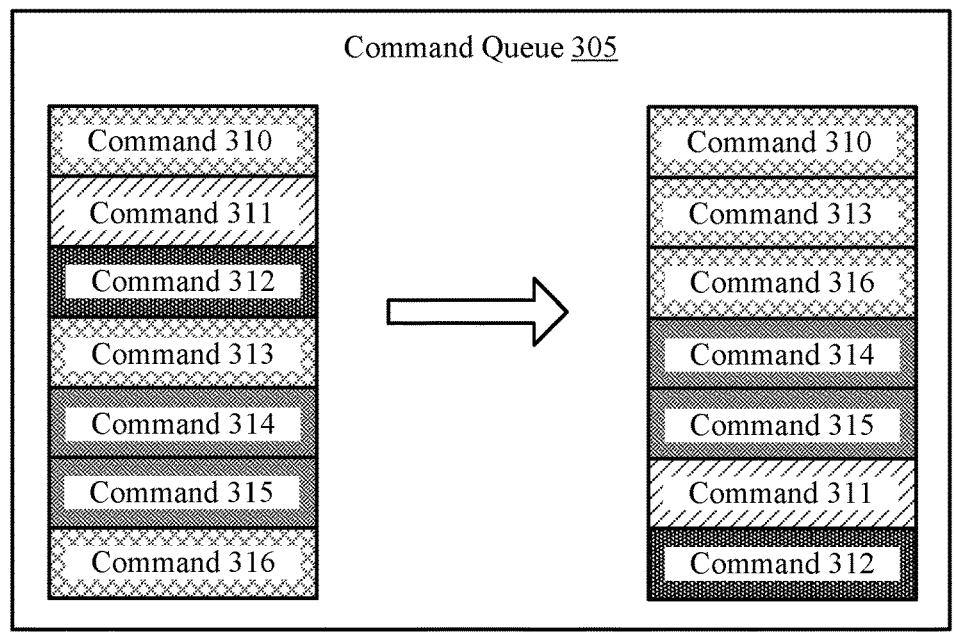
FIG. 3A illustrates an example of a command queue arrangement that supports command prioritization techniques for reducing latency in a memory system in accordance with examples as disclosed herein.

FIG. 3A illustrates an example of a command queue arrangement 301 that supports command prioritization techniques for reducing latency in a memory system in accordance with examples as disclosed herein. In some examples, the command queue arrangement 301 may implement aspects of a system 200. For example, the command queue arrangement 301 may include a command queue 305 which may be an example of a common command queue 230 as described with reference to FIG. 2.

Figure 3B:
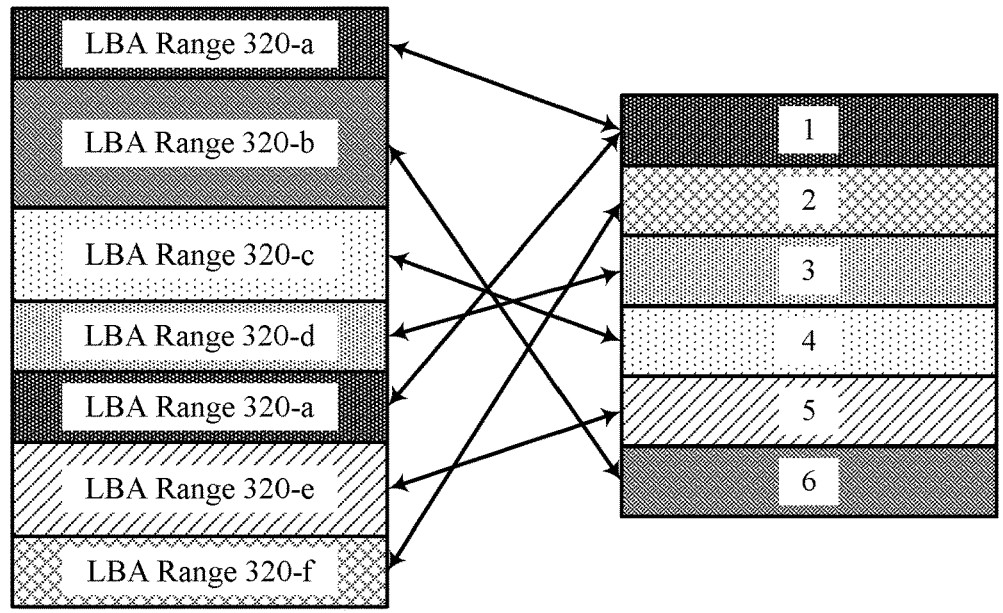
FIG. 3B illustrates an example of a mapping that support command prioritization techniques for reducing latency in a memory system in accordance with examples as described herein.

FIG. 3B illustrates an example of a mapping 302 that supports command prioritization techniques for reducing latency in a memory system in accordance with examples as disclosed herein. In some examples, the mapping 302 may be implemented by aspects of a system 200. For example, the mapping 302 may be implemented by an I/O scheduler 220 as described with reference to FIG. 2.

As described with reference to FIG. 2, a hypervisor (or otherwise known as a host system) may receive a set of commands from two or more virtual machines and arrange a command queue such that commands associated with a same L2P mapping portion may be grouped together. A hypervisor may be an example of hardware, firmware, or software, that creates and runs one or more virtual machines. In some cases, a hypervisor may also be referred to as a virtual machine monitor. A hypervisor may allow one host system to support multiple guest virtual machines by virtually sharing the resources of the host system, such as memory and processing. As one example, the hypervisor may receive a set of commands that includes at least a command 310, a command 311, a command 312, a command 313, a command 314, a command 315, and a command 316. Upon receiving the set of commands from the two or more virtual machines, the hypervisor may initially arrange the commands in the command queue 305 in an order in which the hypervisor received the commands or in a time order. For example, the hypervisor may receive the command 310 prior to the command 311 and therefore give the command 310 higher priority than the command 311 in the command queue 305. Alternatively, a timestamp associated with the command 310 may come before a timestamp associated with the command 311. As shown in FIG. 3A, the initial order of the commands in the command queue 305 may be as follows: the command 310 followed by the command 311 followed by the command 312 followed the command 313 followed by the command 314 followed by the command 315 followed by the command 316. Although FIG. 3A shows seven commands in the command queue 305 at a given time, the command queue 305 may be capable of storing more or less than seven commands at a given time.

The hypervisor may evaluate each command of the set of commands in the command queue 305 and hypothesize which commands of the set are associated with the same L2P mapping portions. In one example, the hypervisor may determine that the command 310, the command 313, and the command 316 are associated with the same L2P mapping portion and group these commands together into a first group of commands. Additionally, the hypervisor may determine that the command 314 and the command 315 are associated with the same L2P mapping portion and group these commands together into a second group of commands. In some examples, the hypervisor may prioritize the grouped commands over non-grouped commands. For example, the hypervisor may prioritize the command 310, the command 313, the command 316, the command 314, and the command 315 over the command 311 and the command 312. Moreover, the hypervisor may prioritize a group of commands including the earliest received command (e.g., command with an earlier timestamp) of the groups of commands over the other groups of commands. For example, the hypervisor may prioritize the first group of commands over the second group of commands because the first group of commands includes the command 310 which had higher priority than the command 314 and the command 315 of the second group of command in the initial command queue (e.g., was received prior to the command 314 and the command 315). As such, a resulting order of the command queue 305 may be as follows: the command 310 followed by the command 313 followed by the command 316 followed the command 314 followed by the command 315 followed by the command 311 followed by the command 312. After arranging the command queue 305, the hypervisor may dispatch the command queue 305 to a memory system and the memory system may execute the commands according to the order.

In order to determine which commands in the command queue 305 are associated with the same L2P mapping portions, the hypervisor may identify one or more patterns of sequential access in the set of commands. In some examples, the hypervisor may first determine, for each command of the set, one or more parameters. The one or more parameters may include element fields of a buffer head attached to each of the commands in the set. The element fields may include a block number, a block size, a buffer data, a block device, etc. which are described in more detail with reference to FIG. 2.

In one example, the hypervisor may determine which commands in the command queue 305 are collocated (e.g., are associated with the same L2P mapping portion) by comparing parameters of different commands in the command queue 305 to one another. If the one or more parameters of a first command of the command queue 305 are within a range of (or similar to) one or more parameters of a second command of the command queue 305, the hypervisor may determine that the first command and the second command are collocated. Alternatively, if the one or more parameters of the first command are not within the range of the one or more parameters of the second command, the hypervisor may determine that the first command and the second command are not collocated. As one example, the one or more parameters may include one or both of a block size or a block number. In the example of FIG. 3A, the hypervisor may determine that the addresses associated with the command 310 and the command 311 are not collocated in the L2P mapping because the command 310 is associated with a block size of X and the command is associated with a block size of Y and the difference between X and Y is greater than the range (otherwise known as threshold). The range or threshold may be a set value and may be stored at a controller of the hypervisor. An algorithm for the above described method of identifying patterns of sequential access in the set of commands is illustrated in Table 1, where B1 b_size is a block size associated with a first command, B2 b_size is a block size associated with a second command, B1 block_nr is a block number associated with a first command, and B2 block_nr is a block number associated with the second command.

TABLE 1

Are_requests_collocated(buffer head B1, buffer head B2)
IF B1 b_size and B2 b_size are similar and B1 block_nr and B2 block_nr are similar
THEN
   RETURN TRUE
ELSE
   RETURN FALSE In another example, the hypervisor may determine which commands are collocated based on the mapping 302. The hypervisor may identify a set of IDs and each ID of the set may correspond to an LBA range 320 of a set of LBA ranges. Each LBA range 320 may include one or more sets of consecutive LBAs and none of the LBA ranges 320 may include the same LBAs That is, the LBA ranges may not overlap one another. In the example of FIG. 3B, the set of LBA ranges may include an LBA range 320-a, an LBA range 320-b, an LBA range 320-c, an LBA range 320-d, an LBA range 320-e, and an LBA range 320-f. In the mapping 302, the LBA range 320-a may be mapped to a first ID, the LBA range 320-b may be mapped to a sixth ID, the LBA range 320-c may be mapped to a fourth ID, the LBA range 320-d may be mapped to third ID, the LBA range 320-e may be mapped to a fifth ID, and the LBA range 320-f may be mapped to a second ID.

The hypervisor may determine an LBA range for each of the commands in the command queue 305 based on the one or more parameters associated with each of the commands and identify an ID for each of the commands using the determined LBA range and the mapping 302. The one or more parameters used to determine the LBA range of a command may include the block size and the block number. In the example of FIG. 3B, the hypervisor may determine that the LBA range of the command 310 is within the LBA range 320-f and as such, may identify that an ID of the command 310 is the second ID. In some examples, it may be possible for the determined LBA range of a command to be within two or more LBA ranges 320. In such case, the command may be associated with two or more IDs. An algorithm for determining one or more IDs associated with a command in the command queue 305 using the mapping 302 is illustrated in Table 2, where address_range may be an LBA range 320, associative_map may be the mapping 302, and ID_set may be the one or more IDs associated with a respective command.

TABLE 2

Get_ID_Set(associative_map, address_range)
ID_set ← { }
Current_ID = first ID in associative map
WHILE address_range IS NOT empty AND Current_ID IS IN associative_map
   common_addresses ← address_range ∩ associative_map (Current_ID)
   IF common_addresses is NOT { } THEN
     ID_set ← ID_set ∪ Current_ID
     address_range ← address_range \ common_addresses
   Current_ID = next_ID IN associative_map
RETURN ID_set The hypervisor may compare the IDs of the different commands to one another and determine whether commands are collocated based on the comparison. Commands whose IDs match may be considered collocated and commands whose IDs do not match may not be considered collocated. In the example of FIG. 3B, the command 310 and the command 313 may be collocated because they are mapped to the same ID (e.g., the second ID). Alternatively, the command 310 and the command 311 may not be collocated because they are not mapped to the same ID. The command 310 is mapped to the second ID and the command 311 is mapped to the fifth ID. An algorithm for determining whether commands of the command queue 305 are collocated using the mapping is illustrated in Table 3, where starting_address(B1) may be a block number associated with a first command, starting_address(B2) may be a block number associated with a second command, where size(B1) may be a block size associated with the first command, and size(B2) may be a block size associated with the second command.

TABLE 3

Are_requests_collocated(buffer_head B1, buffer head B2, associative map)
B1_range ← [starting_address(B1) + size(B1)]
B2_range ← [starting_address(B2) + size(B2)]
L2P_id_set_1 ← get_id_set(B1_range, associative_map)
L2P_id_set_2 ← get_id_set(B2_range, associative_map)
IF L2_id_set_1 IS EQUAL TO L2P_id_set_1 THEN
   RETURN TRUE
ELSE
   RETURN FALSE In some examples, the mapping 302 may be updated based on an actual behavior of the memory system while executing the commands of the command queue 305. When the memory system begins initiating a command of the command queue 305 there may be some delay due to converting the logical address of the command to a physical address. If there is no mapping swapping involved in converting the logical address to the physical address, the delay may be shorter then when there is mapping swapping involved in converting the logical address to the physical address. As such, a time between calling different commands of the command queue may change depending on whether a mapping swap occurs. In some examples, the hypervisor may calculate a time interval between two consecutive calls. If the time interval between the two calls is greater than a threshold, the hypervisor may determine that a mapping swap has occurred and that the commands are not collocated (e.g., not associated with the same L2P mapping portion). If the time interval is smaller than the threshold, the hypervisor may determine that no mapping swap occurred and that the commands are collocated (e.g., associated with the same L2_mapping portion). The hypervisor may update the mapping 302 based on whether the time interval between calls are above or below the threshold. Updating the map may refer to joining together LBA ranges of the two commands or separating the LBA ranges of the two commands. An algorithm for updating the mapping is illustrated in Table 4, where response_time is the time interval between calling a first command and calling a second command.

TABLE 4 associative_map ← { }
Management_time_window ← configurable_parameter
WHILE TRUE
   IF current_time IS IN management_time_window THEN
      FOR every successive pair of I/O call to device, at address range R1 and R2
         MEASURE response_time from device
         IF response_time is LESS THAN threshold THEN
            join_map(associative_map, R1, R2)
         ELSE
            cut_map(associative_map, R1, R2)

As described herein, the hypervisor may update the mapping based on the time interval between calling consecutive commands. In the example of FIG. 3B, the hypervisor may determine that the time interval between calling the command 315 and calling the command 311 is below a threshold which may indicate that no mapping swap occurred. The originally mapping 302 indicates that the command 311 and the command 315 are not collocated (e.g., are mapped to different IDs). As such, the hypervisor may update the mapping such that LBA range associated with the command 315 and the LBA address range associated with the command are associated with the same ID. As one example, the hypervisor may join together the LBA ranges mapped to the fifth ID and the sixth ID, remove the fifth ID and sixth ID, and map the joint LBA range to a new ID. In some examples, the consecutive commands may not be mapped to an ID of the set of IDs. In such case, the hypervisor may join together the LBA address ranges associated with the commands, add a new ID to the set of IDs, and map the joint LBA range to the new ID. An algorithm for updating the mapping 302 as described above is illustrates in Table 5, address_range R1 is the LBA range associated with a first command and address_range R2 is the address range associated with the second command.

TABLE 5 join_map(associative_map, address_range R1, address_range R2)
joint_range ← R1 ∪ R2
ID_set ← Get_ID_Set(associative_map, joint_range)
IF ID_set's size is 0
   add_entry [new_ID, joint_range] to associative_map TABLE 5-continued ELSE IF ID_set's size IS LARGER THAN 1
   FOR ALL Current_IDs in ID_set
      joint_range ← joint_range ∪ associative_map(Current_ID)
      remove_entry Current_ID to associated_map
   add_entry [new_ID, joint_range] to associative_map In another example of FIG. 3B, the hypervisor may determine that the time interval between calling the command 314 and calling the command 315 is above a threshold which may indicate that mapping swapping occurred. The originally mapping 302 indicates that the command 314 and the command 315 are collocated (e.g., are mapped to the same ID). As such, the hypervisor may update the mapping such that LBA range associated with the command 315 and the LBA address range associated with the command are associated with different IDs. As one example, the hypervisor may cut the LBA address that correspond to the command 314 and the command 315 from the LBA range 320-b and map what remains of the LBA range 320-b to the sixth ID. Moreover, the hypervisor may add two new IDs (e.g., a seventh ID and an eighth ID) to the set of IDs, where one ID may be mapped to the LBA range corresponding to the command 314 and the other ID may be mapped to the LBA range corresponding to the command 315. In some examples, the consecutive commands may not be mapped to an ID of the set of IDs. In such case, the hypervisor may simply add two new IDs to the set of IDs, where one ID may be mapped to the LBA range corresponding to the command 314 and the other ID may be mapped to the LBA range corresponding to the command 315. An algorithm for updating the mapping 302 as described above is illustrates in Table 6, address_range R1 may be the LBA range associated with a first command and address_range R2 may be the address range associated with the second command.

Figure 4:
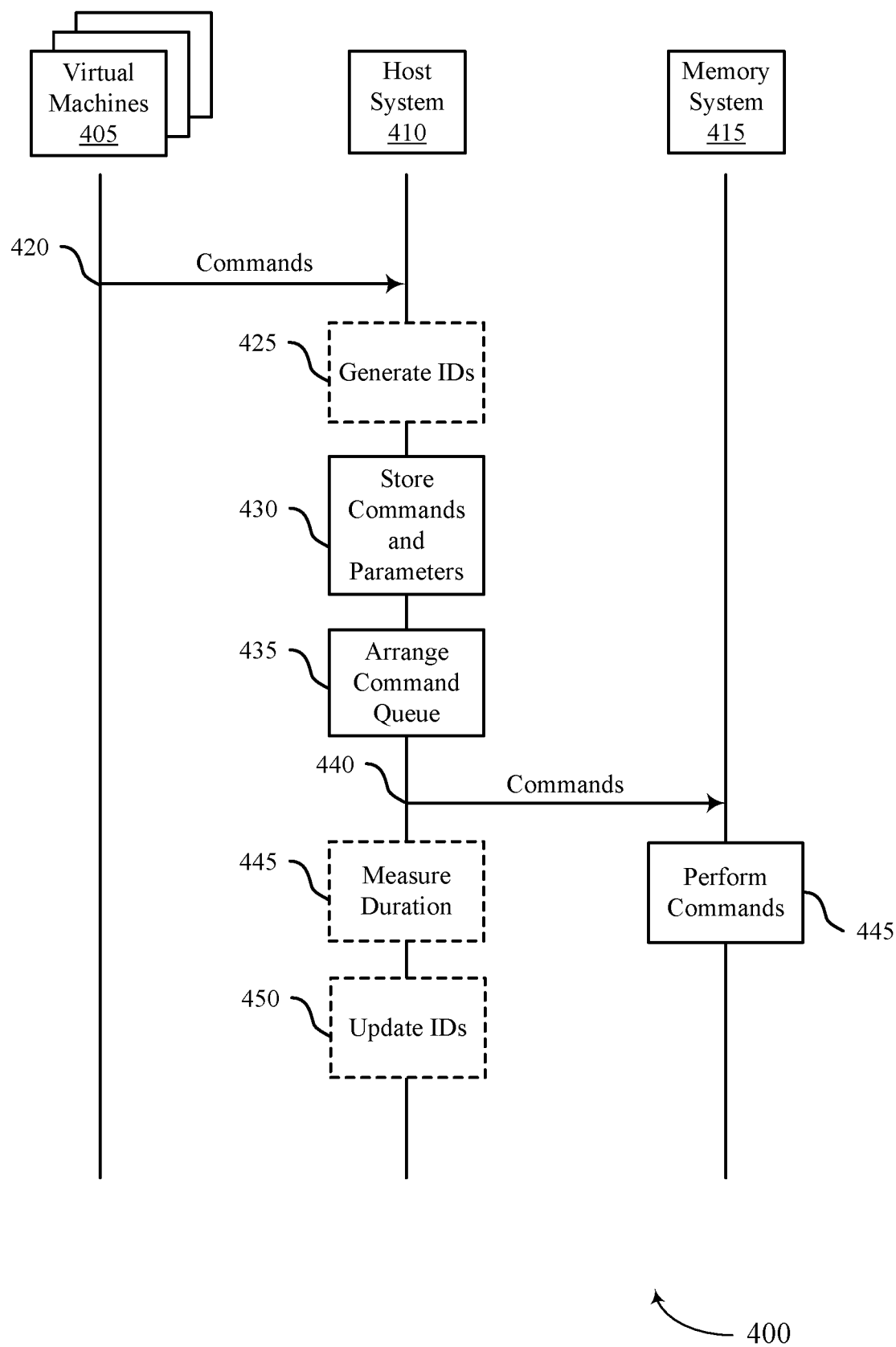
FIG. 4 illustrates an example of a process flow that supports command prioritization techniques for reducing latency in a memory system in accordance with examples as disclosed herein.

TABLE 6 cut_map(associative_map, address_range R1, address_range R2)
ID_set1 ← Get_ID_Set(associative_map, R1)
ID_set2 ← Get_ID_Set(associative_map, R2)
IF ID_set1's size IS LARGER THAN 0
   FOR ALL current_ID in ID_set1
      update associative_map(current_ID) = associative_map(current_ID) \ R1
   add_entry [new_ID, R1] to associative map
IF ID_set2's size IS LARGER THAN 0
   FOR ALL current_ID in ID_set2
      update associative_map(current_ID) = associative_map(current_ID) \ R2
   add_entry [new_ID, R2] to associative_map FIG. 4 illustrates an example of a process flow 400 that supports command prioritization techniques for reducing latency in a memory system in accordance with examples as disclosed herein. In some examples, the process flow 400 may be implemented by aspects of a system 200. For example, the process flow may be implemented by virtual machines 405, a host system 410, and a memory system 415 which may be examples of virtual machines 205, a host system 210, and a memory system 235 as described with reference to FIG. 2. Alternative examples of the following may be implemented, where some steps are performed in a different order then describes or are not performed at all. In some cases, steps may include additional features not mentioned below, or further steps may be added.

At 420, the virtual machines 405 may transmit a set of commands to the host system 410. The set of command may include one or both of read commands or write commands. In some examples, each virtual machine 405 may store a respective subset of the set of commands in a respective command queue and dispatch the respective command queues to the host system 410.

At 425, the host system 410 may potentially generate a set of IDs. Each ID of the set of IDs may identify a respective LBA range of a set of LBA ranges of a memory system 415. That is, a mapping between the set of LBA ranges and the set of IDs may be generated. In some examples, the mapping may be stored at the host system 410 (e.g., at a controller of the host system 410)/

At 430, the host system 410 may store the set of commands in a command queue associated with the memory system 415. In some examples, the host system 410 may additionally store one or more parameters associated with each command of the set of commands. For example, each command may have an attached buffer head. The buffer head may include information related to the command it's attached to. For example, the buffer head may include at least a block size or a block number (e.g., starting logical address) associated with the command its attached to.

At 435, the host system 410 may arrange the set of commands in the command queue according to an order. In some examples, the order may be based on one or more identified patterns of accessing sequential addresses in the set of commands. In one example, the host system 410 may compare the one or more parameters of different commands of the set to determine whether two or more commands are collocated (e.g., correspond to a same L2P mapping portion). For example, the host system 410 may determine that one or more parameters of a first command of the set are within range of one or more parameters of a second command of the set and group the first command and the second command together in the command queue. Commands associated with similar parameters may be associated with the same L2P mapping portion.

As another example, the host system 410 may utilize the mapping determined at 425 to determine whether two or more commands are collocated. In some examples, the host system 410 may determine an ID for each of commands of the set based on an LBA range of a respective command being included in at least one LBA range of the set of LBA ranges (set of LBA ranges mapped to the set of IDs generated at step 425). In some examples, the host system 410 may determine the LBA range for each respective command using the one or more parameters associated with the respective command (e.g., one or both of a block size or a block number). The host system 410 may group commands of the same ID together in the command queue. Commands associated with the same IDs may be associated with the same L2P mapping portions.

At 440, the host system 410 may transmit the set of commands to the memory system 415 based on the order. In one example, the host system 410 may transmit the command queue including the commands to the memory system.

In other examples, the host system 410 may transmit each command of the set one at a time to the memory system 415 based on the order.

At 445, the memory system 415 execute the set of command. In some examples, while the memory system 415 is executing the commands, the host system 410 may record a duration between calling one command of the set and calling a next command of the set (e.g., duration between calling two consecutive calls). In some examples, the host system 410 may record a start time (e.g., time at which a first command is called) and an end time (e.g., time at which the second consecutive command is called) in a time management window (e.g., configurable parameter). If the difference between the start time and end time (e.g., response time of the memory system 415) is larger than a threshold, the memory system 415 may assume that a mapping swap occurred and that the commands are not collocated. Alternatively, if the difference between the start time and the end time are less than the threshold, then the memory system 415 may assume that a mapping swap did not occur and that the commands are collocated. Measuring the duration between calls may allow the host system 410 to validate the mapping or the set of IDs generated at step 425 and subsequently update the mapping or the set of IDs at 450 if the mapping or the set of IDs is not validated as described in more detail with reference to FIGS. 3A and 3B.

Figure 5:
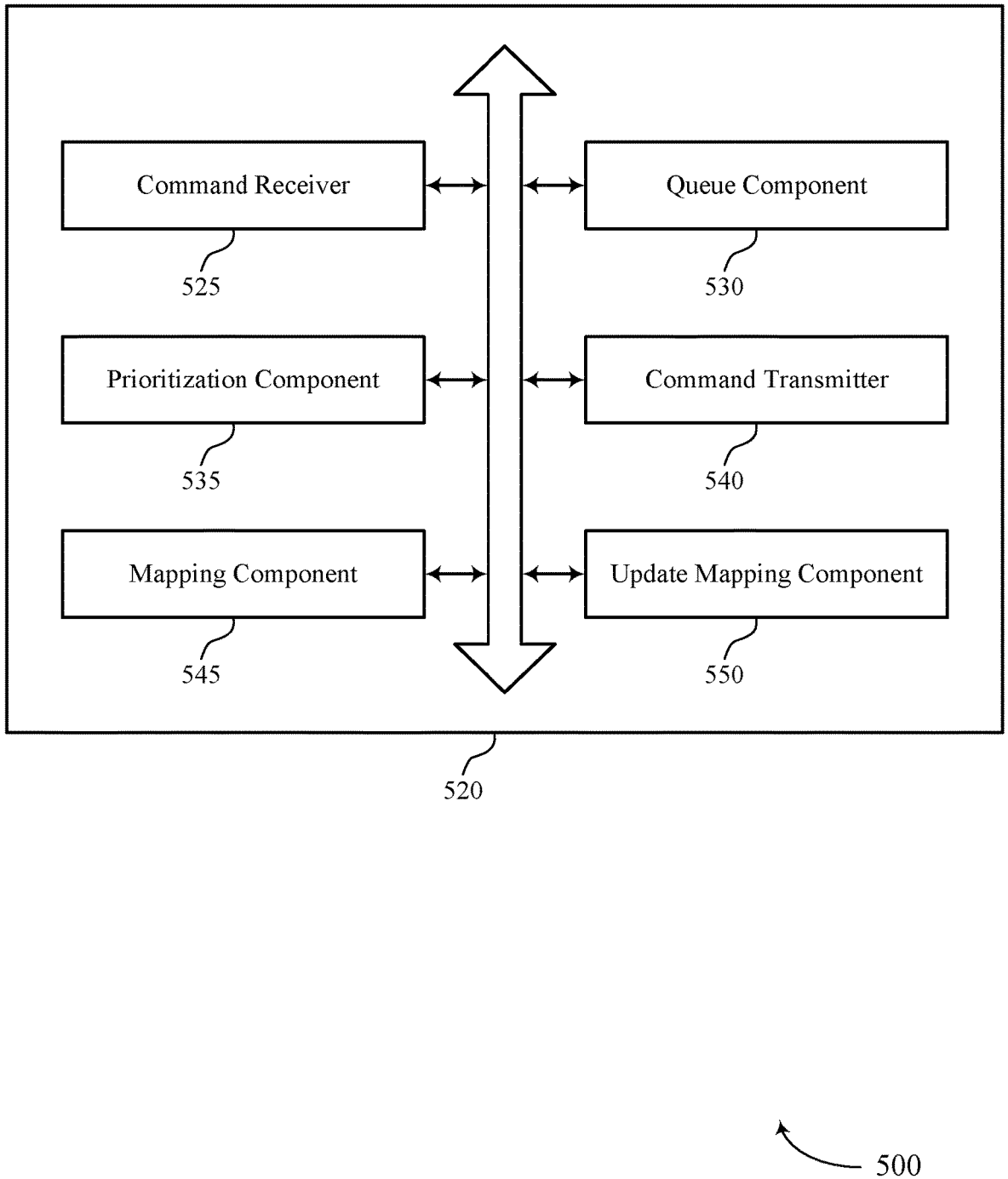
FIG. 5 shows a block diagram of a host system that supports command prioritization techniques for reducing latency in a memory system in accordance with examples as disclosed herein.

FIG. 5 shows a block diagram 500 of a host system 520 that supports command prioritization techniques for reducing latency in a memory system in accordance with examples as disclosed herein. The host system 520 may be an example of aspects of a host system as described with reference to FIGS. 1 through 4. The host system 520, or various components thereof, may be an example of means for performing various aspects of command prioritization techniques for reducing latency in a memory system as described herein. For example, the host system 520 may include a command receiver 525, a queue component 530, a prioritization component 535, a command transmitter 540, a mapping component 545, an update mapping component 550, or any combination thereof. Each of these components may communicate, directly or indirectly, with one another (e.g., via one or more buses).

The command receiver 525 may be configured as or otherwise support a means for receiving, from one or more virtual machines, a plurality of commands to access a memory system common to the one or more virtual machines. The queue component 530 may be configured as or otherwise support a means for storing, in a command queue associated with the memory system, the plurality of commands and a set of parameters associated with each command of the plurality of commands. The prioritization component 535 may be configured as or otherwise support a means for arranging the plurality of commands according to an order that is based at least in part on one or more identified patterns of accessing sequential addresses in the plurality of commands. The command transmitter 540 may be configured as or otherwise support a means for transmitting the plurality of commands to the memory system based at least in part on the order.

In some examples, the prioritization component 535 may be configured as or otherwise support a means for determining that a first set of parameters associated with a first command of the plurality of commands is within a range of a second set of parameters associated with a second command of the plurality of commands based at least in part on a comparison between the first set of parameters and the second set of parameters, where arranging the plurality of commands is based at least in part on the determining.

In some examples, to support arranging the plurality of commands according to the order, the prioritization component 535 may be configured as or otherwise support a means for grouping the first command with the second command based at least in part on determining that the first set of parameters is within the range of the second set of parameters.

In some examples, the mapping component 545 may be configured as or otherwise support a means for generating a set of identifiers, where each identifier of the set of identifiers identifies a respective logical address range of a subset of logical address ranges of the memory system, where arranging the plurality of commands is based at least in part on the generating.

In some examples, the prioritization component 535 may be configured as or otherwise support a means for determining, based at least in part on a first set of parameters associated with a first command of the plurality of commands, that a logical address range included in the first command is included in a first logical address range of the plurality of logical address ranges. In some examples, the prioritization component 535 may be configured as or otherwise support a means for determining, based at least in part on a second set of parameters associated with a second command of the plurality of commands, that a logical address range included in the second command is included in a second logical address range of the plurality of logical address ranges.

In some examples, the prioritization component 535 may be configured as or otherwise support a means for identifying, from the set of identifiers and based at least in part on determining that the logical address range included in the first command is included in the first logical address range, a first identifier for the first command, wherein the first identifier identifies the first logical address range. In some examples, the prioritization component 535 may be configured as or otherwise support a means for identifying, from the set of identifiers and based at least in part on determining that the logical address range included in the second command is included in the second logical address range, a second identifier for the second command, wherein the second identifier identifies the second logical address range.

In some examples, the prioritization component 535 may be configured as or otherwise support a means for determining that the first identifier matches the second identifier based at least in part on a comparison of the first identifier and the second identifier, where arranging the plurality of commands is based at least in part on the determining.

In some examples, to support arranging the plurality of commands according to the order, the prioritization component 535 may be configured as or otherwise support a means for grouping the first command with the second command based at least in part on determining that the first identifier matches the second identifier.

In some examples, the update mapping component 550 may be configured as or otherwise support a means for measuring a duration between the memory system beginning to perform a first command of the plurality of commands and the memory system beginning to perform a second command of the plurality of commands, where the first command and the second command are performed consecutively. In some examples, the update mapping component 550 may be configured as or otherwise support a means for updating the set of identifiers and their respective logical address ranges based at least in part on the duration satisfying a threshold.

In some examples, to support updating the set of identifiers and their respective logical address ranges, the update mapping component 550 may be configured as or otherwise support a means for combining a first logical address range included in the first command with a second logical address range included in the second command based at least in part on the duration being less than the threshold. In some examples, to support updating the set of identifiers and their respective logical address ranges, the update mapping component 550 may be configured as or otherwise support a means for identifying a relationship between an identifier of the set of identifiers and a joint logical address range including the first logical address range and the second logical address range.

In some examples, to support updating the set of identifiers and their respective logical address ranges, the update mapping component 550 may be configured as or otherwise support a means for identifying a relationship between a first logical address range included in the first command and a first identifier of the set of identifiers and a relationship between a second logical address range included in the second command and a second identifier of the set of identifiers different from the first identifier based at least in part on the duration being greater than the threshold.

In some examples, the threshold is based at least in part on a command type of the first command and the second command. In some examples, the command type includes one of a read command or a write command.

In some examples, to support measuring the duration, the update mapping component 550 may be configured as or otherwise support a means for measuring the duration between the memory system calling the first command and the memory system calling the second command.

In some examples, the set of parameters includes one or both of a starting logical address or a block size of a respective command of the set of commands.

In some examples, the plurality of commands are received at an I/O scheduler of a hypervisor associated with the one or more virtual machines or a host system.

Figure 6:
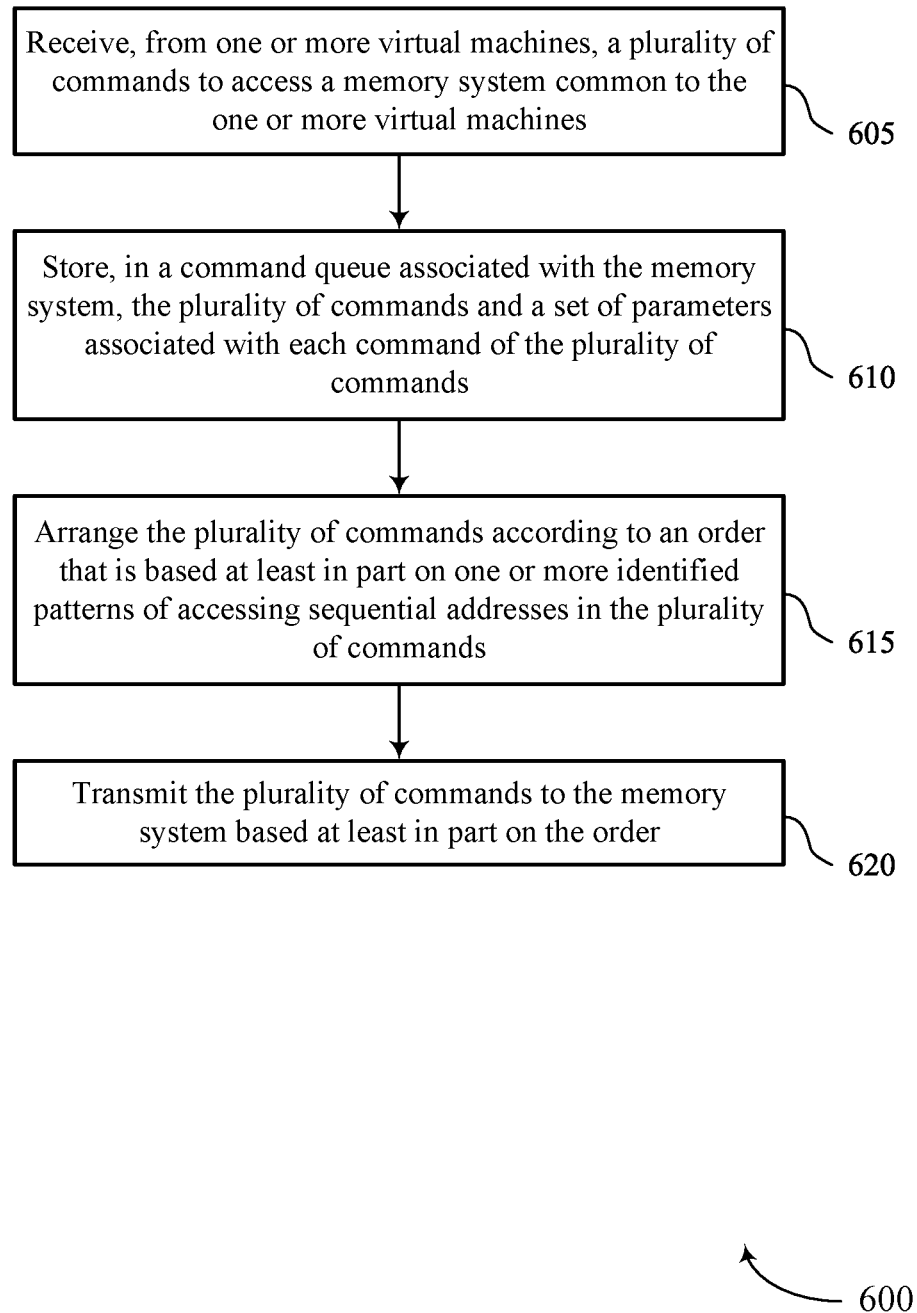
FIGS. 6 through 8 show flowcharts illustrating a method or methods that support command prioritization techniques for reducing latency in a memory system in accordance with examples as disclosed herein.

FIG. 6 shows a flowchart illustrating a method 600 that supports command prioritization techniques for reducing latency in a memory system in accordance with examples as disclosed herein. The operations of method 600 may be implemented by a host system or its components as described herein. For example, the operations of method 600 may be performed by a host system as described with reference to FIGS. 1 through 5. In some examples, a host system may execute a set of instructions to control the functional elements of the device to perform the described functions. Additionally or alternatively, the host system may perform aspects of the described functions using special-purpose hardware.

At 605, the method may include receiving, from one or more virtual machines, a plurality of commands to access a memory system common to the one or more virtual machines. The operations of 605 may be performed in accordance with examples as disclosed herein. In some examples, aspects of the operations of 605 may be performed by a command receiver 525 as described with reference to FIG. 5.

At 610, the method may include storing, in a command queue associated with the memory system, the plurality of commands and a set of parameters associated with each command of the plurality of commands. The operations of 610 may be performed in accordance with examples as disclosed herein. In some examples, aspects of the operations of 610 may be performed by a queue component 530 as described with reference to FIG. 5.

At 615, the method may include arranging the plurality of commands according to an order that is based at least in part on one or more identified patterns of accessing sequential addresses in the plurality of commands. The operations of 615 may be performed in accordance with examples as disclosed herein. In some examples, aspects of the operations of 615 may be performed by a prioritization component 535 as described with reference to FIG. 5.

At 620, the method may include transmitting the plurality of commands to the memory system based at least in part on the order. The operations of 620 may be performed in accordance with examples as disclosed herein. In some examples, aspects of the operations of 620 may be performed by a command transmitter 540 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for receiving, from one or more virtual machines, a plurality of commands to access a memory system common to the one or more virtual machines; storing, in a command queue associated with the memory system, the plurality of commands and a set of parameters associated with each command of the plurality of commands; arranging the plurality of commands according to an order that is based at least in part on one or more identified patterns of accessing sequential addresses in the plurality of commands; and transmitting the plurality of commands to the memory system based at least in part on the order.

Aspect 2: The apparatus of aspect 1, further including operations, features, circuitry, logic, means, or instructions, or any combination thereof for determining that a first set of parameters associated with a first command of the plurality of commands is within a range of a second set of parameters associated with a second command of the plurality of commands based at least in part on a comparison between the first set of parameters and the second set of parameters, where arranging the plurality of commands is based at least in part on the determining.

Aspect 3: The apparatus of aspect 2 where arranging the plurality of commands according to the order, further includes operations, features, circuitry, logic, means, or instructions, or any combination thereof for grouping the first command with the second command based at least in part on determining that the first set of parameters is within the range of the second set of parameters.

Aspect 4: The apparatus of any of aspects 1 through 3, further including operations, features, circuitry, logic, means, or instructions, or any combination thereof for generating a set of identifiers, where each identifier of the set of identifiers identifies a respective logical address range of a subset of logical address ranges of the memory system, where arranging the plurality of commands is based at least in part on the generating.

Aspect 5: The apparatus of aspect 4, further including operations, features, circuitry, logic, means, or instructions, or any combination thereof for determining, based at least in part on a first set of parameters associated with a first command of the plurality of commands, that a logical address range included in the first command is included in a first logical address range of the plurality of logical address ranges and determining, based at least in part on a second set of parameters associated with a second command of the plurality of commands, that a logical address range included in the second command is included in a second logical address range of the plurality of logical address ranges.

Aspect 6: The apparatus of aspect 5, further including operations, features, circuitry, logic, means, or instructions, or any combination thereof for identifying, from the set of identifiers and based at least in part on determining that the logical address range included in the first command is included in the first logical address range, a first identifier for the first command, wherein the first identifier identifies the first logical address and identifying, from the set of identifiers and based at least in part on determining that the logical address range included in the second command is included in the second logical address range, a second identifier for the second command, wherein the second identifier identifies the second logical address range.

Aspect 7: The apparatus of aspect 6, further including operations, features, circuitry, logic, means, or instructions, or any combination thereof for determining that the first identifier matches the second identifier based at least in part on a comparison of the first identifier and the second identifier, where arranging the plurality of commands is based at least in part on the determining.

Aspect 8: The apparatus of aspect 7 where arranging the plurality of commands according to the order, further includes operations, features, circuitry, logic, means, or instructions, or any combination thereof for grouping the first command with the second command based at least in part on determining that the first identifier matches the second identifier.

Aspect 9: The apparatus of any of aspects 4 through 8, further including operations, features, circuitry, logic, means, or instructions, or any combination thereof for measuring a duration between the memory system beginning to perform a first command of the plurality of commands and the memory system beginning to perform a second command of the plurality of commands, where the first command and the second command are performed consecutively and updating the set of identifiers and their respective logical address ranges based at least in part on the duration satisfying a threshold.

Aspect 10: The apparatus of aspect 9 where updating the set of identifiers and their respective logical address ranges, further includes operations, features, circuitry, logic, means, or instructions, or any combination thereof for combining a first logical address range included in the first command with a second logical address range included in the second command based at least in part on the duration being less than the threshold and identifying a relationship between an identifier of the set of identifiers and a joint logical address range including the first logical address range and the second logical address range.

Aspect 11: The apparatus of any of aspects 9 through 10 where updating the set of identifiers and their respective logical address ranges, further includes operations, features, circuitry, logic, means, or instructions, or any combination thereof for identifying a relationship between a first logical address range included in the first command and a first identifier of the set of identifiers and a relationship between a second logical address range included in the second command and a second identifier of the set of identifiers different from the first identifier based at least in part on the duration being greater than the threshold.

Aspect 12: The apparatus of any of aspects 9 through 11, further including operations, features, circuitry, logic, means, or instructions, or any combination thereof for the threshold is based at least in part on a command type of the first command and the second command and the command type includes one of a read command or a write command.

Aspect 13: The apparatus of any of aspects 9 through 12 where measuring the duration, further includes operations, features, circuitry, logic, means, or instructions, or any combination thereof for measuring the duration between the memory system calling the first command and the memory system calling the second command.

Aspect 14: The apparatus of any of aspects 1 through 13, further including operations, features, circuitry, logic, means, or instructions, or any combination thereof for the set of parameters includes one or both of a starting logical address or a block size of a respective command of the plurality of commands.

Aspect 15: The apparatus of any of aspects 1 through 14, further including operations, features, circuitry, logic, means, or instructions, or any combination thereof for the plurality of commands are received at an I/O scheduler of a hypervisor associated with the one or more virtual machines or a host system.

Figure 7:
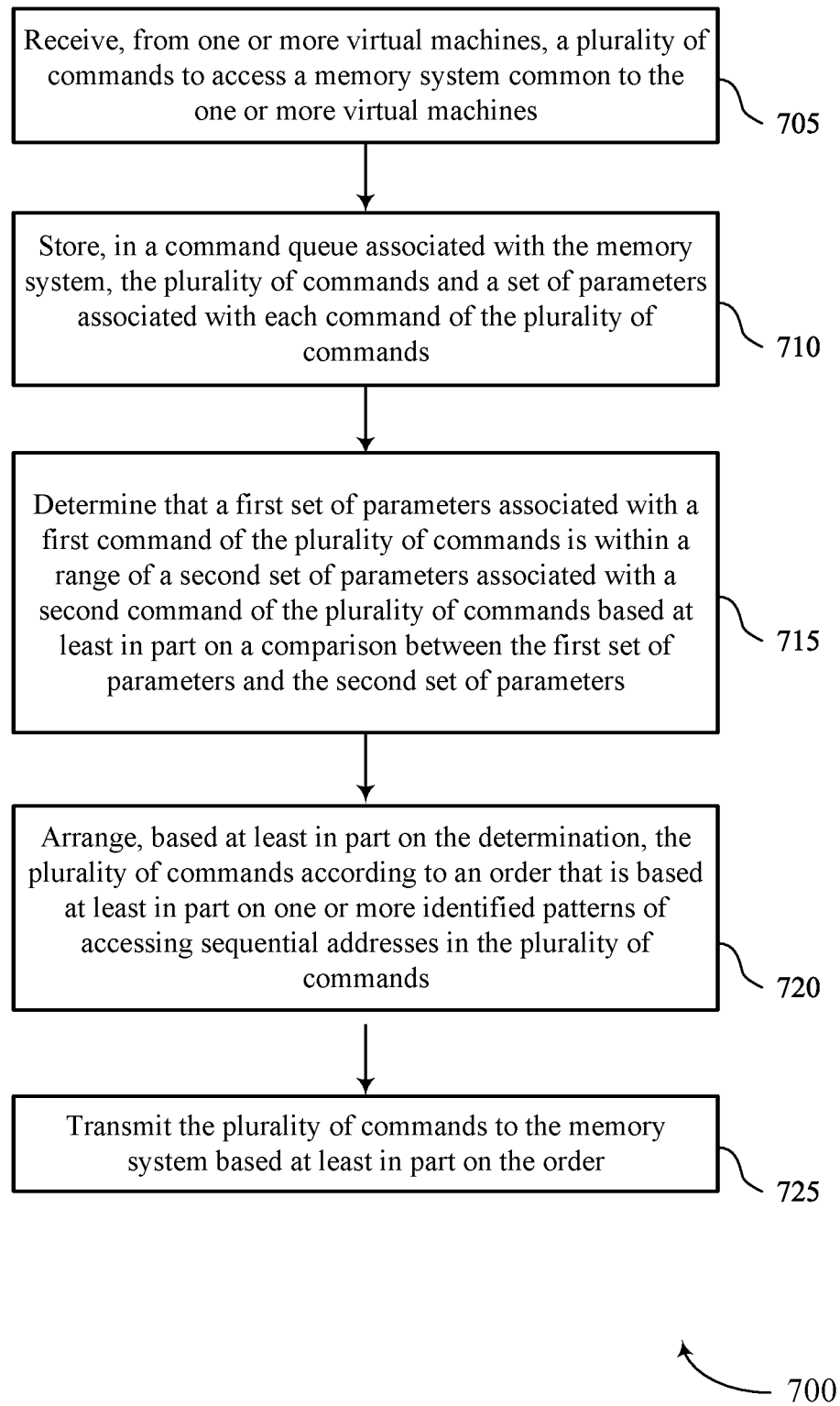

FIG. 7 shows a flowchart illustrating a method 700 that supports command prioritization techniques for reducing latency in a memory system in accordance with examples as disclosed herein. The operations of method 700 may be implemented by a host system or its components as described herein. For example, the operations of method 700 may be performed by a host system as described with reference to FIGS. 1 through 5. In some examples, a host system may execute a set of instructions to control the functional elements of the device to perform the described functions. Additionally or alternatively, the host system may perform aspects of the described functions using special-purpose hardware.

At 705, the method may include receiving, from one or more virtual machines, a plurality of commands to access a memory system common to the one or more virtual machines. The operations of 705 may be performed in accordance with examples as disclosed herein. In some examples, aspects of the operations of 705 may be performed by a command receiver 525 as described with reference to FIG. 5.

At 710, the method may include storing, in a command queue associated with the memory system, the plurality of commands and a set of parameters associated with each command of the plurality of commands. The operations of 710 may be performed in accordance with examples as disclosed herein. In some examples, aspects of the operations of 710 may be performed by a queue component 530 as described with reference to FIG. 5.

At 715, the method may include determining that a first set of parameters associated with a first command of the plurality of commands is within a range of a second set of parameters associated with a second command of the plurality of commands based at least in part on a comparison between the first set of parameters and the second set of parameters. The operations of 715 may be performed in accordance with examples as disclosed herein. In some examples, aspects of the operations of 715 may be performed by a prioritization component 535 as described with reference to FIG. 5.

At 720, the method may include arranging, based at least in part on the determination, the plurality of commands according to an order that is based at least in part on one or more identified patterns of accessing sequential addresses in the plurality of commands. The operations of 720 may be performed in accordance with examples as disclosed herein. In some examples, aspects of the operations of 720 may be performed by a prioritization component 535 as described with reference to FIG. 5.

At 725, the method may include transmitting the plurality of commands to the memory system based at least in part on the order. The operations of 725 may be performed in accordance with examples as disclosed herein. In some examples, aspects of the operations of 725 may be performed by a command transmitter 540 as described with reference to FIG. 5.

Figure 8:
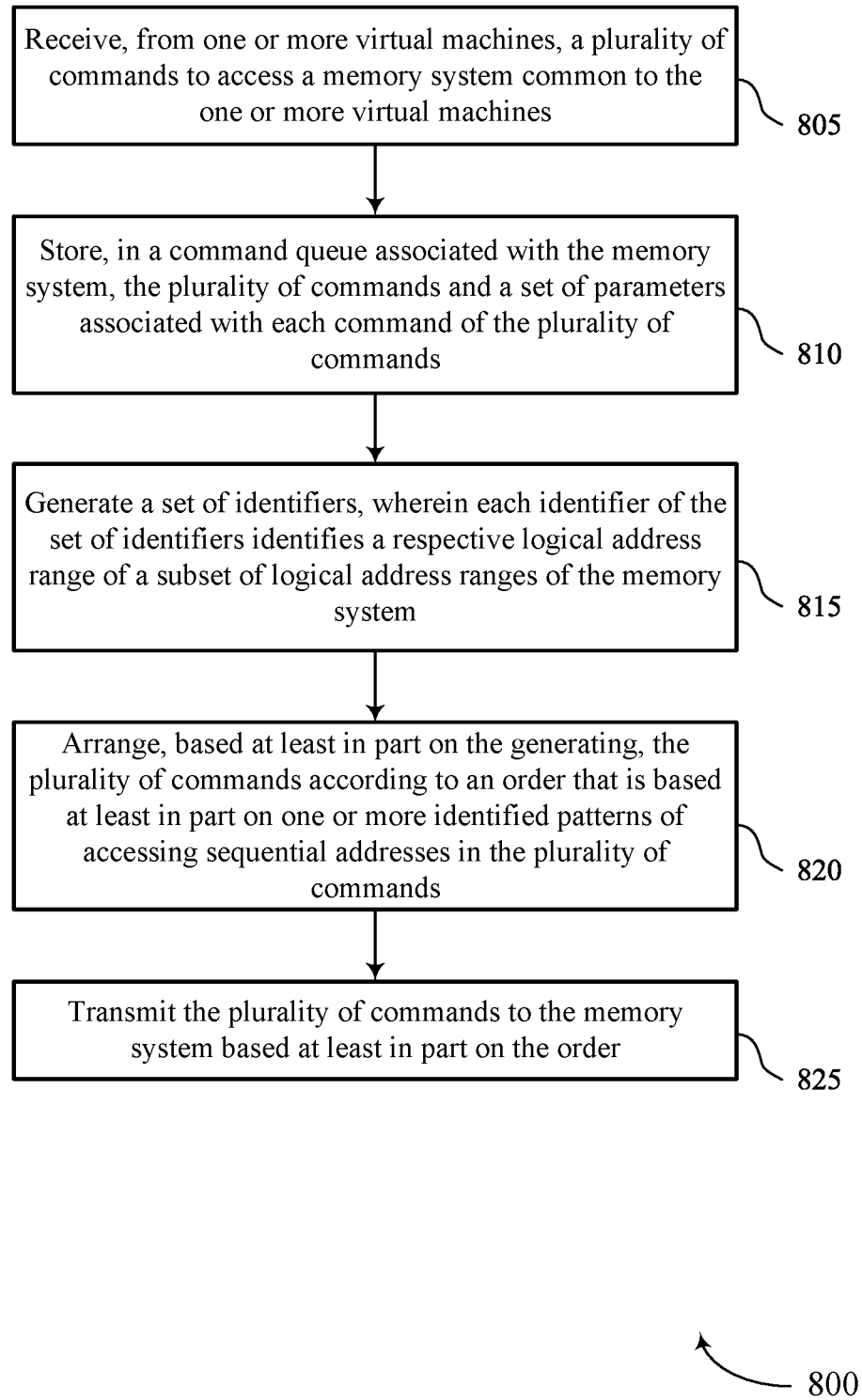

FIG. 8 shows a flowchart illustrating a method 800 that supports command prioritization techniques for reducing latency in a memory system in accordance with examples as disclosed herein. The operations of method 800 may be implemented by a host system or its components as described herein. For example, the operations of method 800 may be performed by a host system as described with reference to FIGS. 1 through 5. In some examples, a host system may execute a set of instructions to control the functional elements of the device to perform the described functions. Additionally or alternatively, the host system may perform aspects of the described functions using special-purpose hardware.

At 805, the method may include receiving, from one or more virtual machines, a plurality of commands to access a memory system common to the one or more virtual machines. The operations of 805 may be performed in accordance with examples as disclosed herein. In some examples, aspects of the operations of 805 may be performed by a command receiver 525 as described with reference to FIG. 5.

At 810, the method may include storing, in a command queue associated with the memory system, the plurality of commands and a set of parameters associated with each command of the plurality of commands. The operations of 810 may be performed in accordance with examples as disclosed herein. In some examples, aspects of the operations of 810 may be performed by a queue component 530 as described with reference to FIG. 5.

At 815, the method may include generating a set of identifiers, where each identifier of the set of identifiers identifies a respective logical address range of a subset of logical address ranges of the memory system. The operations of 815 may be performed in accordance with examples as disclosed herein. In some examples, aspects of the operations of 815 may be performed by a mapping component 545 as described with reference to FIG. 5.

At 820, the method may include arranging, based at least in part on the generating, the plurality of commands according to an order that is based at least in part on one or more identified patterns of accessing sequential addresses in the plurality of commands. The operations of 820 may be performed in accordance with examples as disclosed herein. In some examples, aspects of the operations of 820 may be performed by a prioritization component 535 as described with reference to FIG. 5.

At 825, the method may include transmitting the plurality of commands to the memory system based at least in part on the order. The operations of 825 may be performed in accordance with examples as disclosed herein. In some examples, aspects of the operations of 825 may be performed by a command transmitter 540 as described with reference to FIG. 5.

It should be noted that the methods described above describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 16: An apparatus, including: a controller configured to cause the apparatus to: receive, from one or more virtual machines, a plurality of commands to access a memory system common to the one or more virtual machines; store, in a command queue associated with the memory system, the plurality of commands and a set of parameters associated with each command of the plurality of commands; arrange the plurality of commands according to an order that is based at least in part on one or more identified patterns of accessing sequential addresses in the plurality of commands; and transmit the plurality of commands to the memory system based at least in part on the order.

Aspect 17: The apparatus of aspect 16, where the controller is further configured to cause the apparatus to: determine that a first set of parameters associated with a first command of the plurality of commands is within a range of a second set of parameters associated with a second command of the plurality of commands based at least in part on a comparison between the first set of parameters and the second set of parameters, where arranging the plurality of commands is based at least in part on the determining.

Aspect 18: The apparatus of aspect 17, where the controller configured to cause the apparatus to arrange the plurality of commands according to the order is configured to cause the apparatus to: group the first command with the second command based at least in part on determining that the first set of parameters is within the range of the second set of parameters.

Aspect 19: The apparatus of any of aspects 16 through 18, where the controller is further configured to cause the apparatus to: generate a set of identifiers, where each identifier of the set of identifiers identifies a respective logical address range of a subset of logical address ranges of the memory system, where arranging the plurality of commands is based at least in part on the generating.

Aspect 20: The apparatus of aspect 19, where the controller is further configured to cause the apparatus to: determine, based at least in part on a first set of parameters associated with a first command of the plurality of commands, that a logical address range included in the first command is included in a first logical address range of the plurality of logical address ranges; and determine, based at least in part on a second set of parameters associated with a second command of the plurality of commands, that a logical address range included in the second command is included in a second logical address range of the plurality of logical address ranges.

Aspect 21: The apparatus of aspect 20, where the controller is further configured to cause the apparatus to: identify, from the set of identifiers and based at least in part on determining that the logical address range included in the first command is included in the first logical address range, a first identifier for the first command, wherein the first identifier identifies the first logical address range; and identify, from the set of identifiers and based at least in part on determining that the logical address range included in the second command is included in the second logical address range, a second identifier for the second command, wherein the second identifier identifies the second logical address range.

Aspect 22: The apparatus of aspect 21, where the controller is further configured to cause the apparatus to: determine that the first identifier matches the second identifier based at least in part on a comparison of the first identifier and the second identifier, where arranging the plurality of commands is based at least in part on the determining.

Aspect 23: The apparatus of aspect 22, where the controller configured to cause the apparatus to arrange the plurality of commands according to the order is configured to cause the apparatus to: group the first command with the second command based at least in part on determining that the first identifier matches the second identifier.

Aspect 24: The apparatus of any of aspects 19 through 23, where the controller is further configured to cause the apparatus to: measure a duration between the memory system beginning to perform a first command of the plurality of commands and the memory system beginning to perform a second command of the plurality of commands, where the first command and the second command are performed consecutively; and update the set of identifiers and their respective logical address ranges based at least in part on the duration satisfying a threshold.

An apparatus is described. The following provides an overview of aspects of the apparatus as described herein:

Aspect 25: An apparatus, including: a hypervisor coupled to one or more virtual machines and a memory system; and an I/O scheduler associated with the hypervisor and configured to cause the apparatus to: receive, from the one or more virtual machines, a plurality of commands to access the memory system common to the one or more virtual machines; store, in a command queue associated with the memory system, the plurality of commands and a set of parameters associated with each command of the plurality of commands; arrange the plurality of commands according to an order that is based at least in part on one or more identified patterns of accessing sequential addresses in the plurality of commands; and transmit the plurality of commands to the memory system based at least in part on the order.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
receiving, by a host system and from one or more virtual machines associated with the host system, a plurality of commands to access a memory system common to the one or more virtual machines;
storing, in a command queue of the host system associated with the memory system, the plurality of commands and a set of parameters associated with each command of the plurality of commands according to a first order;
arranging, by the host system, the plurality of commands within the command queue from the first order to a second order that is based at least in part on one or more identified patterns of accessing sequential addresses in the plurality of commands; and
transmitting the plurality of commands to the memory system based at least in part on the second order.

2. The method of claim 1, further comprising:
determining that a first set of parameters associated with a first command of the plurality of commands is within a range of a second set of parameters associated with a second command of the plurality of commands based at least in part on a comparison between the first set of parameters and the second set of parameters, wherein arranging the plurality of commands is based at least in part on the determining.

3. The method of claim 2, wherein arranging the plurality of commands according to the second order comprises:
grouping the first command with the second command based at least in part on determining that the first set of parameters is within the range of the second set of parameters.

4. The method of claim 1, further comprising:
generating a set of identifiers, wherein each identifier of the set of identifiers identifies a respective logical address range of a subset of logical address ranges of the memory system, wherein arranging the plurality of commands is based at least in part on the generating.

5. The method of claim 4, further comprising:
determining, based at least in part on a first set of parameters associated with a first command of the plurality of commands, that a logical address range included in the first command is included in a first logical address range of the subset of logical address ranges; and
determining, based at least in part on a second set of parameters associated with a second command of the plurality of commands, that a logical address range included in the second command is included in a second logical address range of the subset of logical address ranges.

6. The method of claim 5, further comprising:
identifying, from the set of identifiers and based at least in part on determining that the logical address range included in the first command is included in the first logical address range, a first identifier for the first command, wherein the first identifier identifies the first logical address range; and
identifying, from the set of identifiers and based at least in part on determining that the logical address range included in the second command is included in the second logical address range, a second identifier for the second command, wherein the second identifier identifies the second logical address range.

7. The method of claim 6, further comprising:
determining that the first identifier matches the second identifier based at least in part on a comparison of the first identifier and the second identifier, wherein arranging the plurality of commands is based at least in part on the determining.

8. The method of claim 7, wherein arranging the plurality of commands according to the second order comprises:
grouping the first command with the second command based at least in part on determining that the first identifier matches the second identifier.

9. A method, comprising:
receiving, from one or more virtual machines, a plurality of commands to access a memory system common to the one or more virtual machines;
storing, in a command queue associated with the memory system, the plurality of commands and a set of parameters associated with each command of the plurality of commands;
generating a set of identifiers, wherein each identifier of the set of identifiers identifies a respective logical address range of a subset of logical address ranges of the memory system, wherein arranging the plurality of commands is based at least in part on the generating;
arranging the plurality of commands according to an order that is based at least in part on one or more identified patterns of accessing sequential addresses in the plurality of commands;
transmitting the plurality of commands to the memory system based at least in part on the order;
measuring a duration between the memory system beginning to perform a first command of the plurality of commands and the memory system beginning to perform a second command of the plurality of commands, wherein the first command and the second command are performed consecutively; and
updating the set of identifiers and respective logical address ranges based at least in part on the duration satisfying a threshold.

10. The method of claim 9, wherein updating the set of identifiers and the respective logical address ranges comprises:
combining a first logical address range included in the first command with a second logical address range included in the second command based at least in part on the duration being less than the threshold; and
identifying a relationship between an identifier of the set of identifiers and a joint logical address range comprising the first logical address range and the second logical address range.

11. The method of claim 9, wherein updating the set of identifiers and the respective logical address ranges comprises:

identifying a relationship between a first logical address range included in the first command and a first identifier of the set of identifiers and a relationship between a second logical address range included in the second command and a second identifier of the set of identifiers different from the first identifier based at least in part on the duration being greater than the threshold.

12. The method of claim 9, wherein:
the threshold is based at least in part on a command type of the first command and the second command; and
the command type comprises one of a read command or a write command.

13. The method of claim 9, wherein measuring the duration comprises:
measuring the duration between the memory system calling the first command and the memory system calling the second command.

14. The method of claim 1, wherein the set of parameters comprises one or both of a starting logical address or a block size of a respective command of the plurality of commands.

15. The method of claim 1, wherein the plurality of commands are received at an input/output (I/O) scheduler of a hypervisor associated with the one or more virtual machines associated with the host system.

16. An apparatus, comprising:
a controller configured to cause the apparatus to:
receive, by a host system and from one or more virtual machines associated with the host system, a plurality of commands to access a memory system common to the one or more virtual machines;
store, in a command queue of the host system associated with the memory system, the plurality of commands and a set of parameters associated with each command of the plurality of commands according to a first order;
arrange, by the host system, the plurality of commands within the command queue from the first order to a second order that is based at least in part on one or more identified patterns of accessing sequential addresses in the plurality of commands; and
transmit the plurality of commands from the host system to the memory system based at least in part on the second order.

17. The apparatus of claim 16, wherein the controller is further configured to cause the apparatus to:
determine that a first set of parameters associated with a first command of the plurality of commands is within a range of a second set of parameters associated with a second command of the plurality of commands based at least in part on a comparison between the first set of parameters and the second set of parameters, wherein arranging the plurality of commands is based at least in part on the determining.

18. The apparatus of claim 17, wherein the controller configured to cause the apparatus to arrange the plurality of commands according to the second order is configured to cause the apparatus to:
group the first command with the second command based at least in part on determining that the first set of parameters is within the range of the second set of parameters.

19. The apparatus of claim 16, wherein the controller is further configured to cause the apparatus to:
generate a set of identifiers, wherein each identifier of the set of identifiers identifies a respective logical address range of a plurality of logical address ranges of the memory system, wherein arranging the plurality of commands is based at least in part on the generating.

20. The apparatus of claim 19, wherein the controller is further configured to cause the apparatus to:
   determine, based at least in part on a first set of parameters associated with a first command of the plurality of commands, that a logical address range included in the first command is included in a first logical address range of the plurality of logical address ranges; and
   determine, based at least in part on a second set of parameters associated with a second command of the plurality of commands, that a logical address range included in the second command is included in a second logical address range of the plurality of logical address ranges.

21. The apparatus of claim 20, wherein the controller is further configured to cause the apparatus to:
   identify, from the set of identifiers and based at least in part on determining that the logical address range included in the first command is included in the first logical address range, a first identifier for the first command, wherein the first identifier identifies the first logical address range; and
   identify, from the set of identifiers and based at least in part on determining that the logical address range included in the second command is included in the second logical address range, a second identifier for the second command, wherein the second identifier identifies the second logical address range.

22. The apparatus of claim 21, wherein the controller is further configured to cause the apparatus to:
   determine that the first identifier matches the second identifier based at least in part on a comparison of the first identifier and the second identifier, wherein arranging the plurality of commands is based at least in part on the determining.

23. The apparatus of claim 22, wherein the controller configured to cause the apparatus to arrange the plurality of commands according to the second order is configured to cause the apparatus to:
   group the first command with the second command based at least in part on determining that the first identifier matches the second identifier.

24. An apparatus, comprising:
   a controller configured to cause the apparatus to:
   receive, from one or more virtual machines, a plurality of commands to access a memory system common to the one or more virtual machines;
   store, in a command queue associated with the memory system, the plurality of commands and a set of parameters associated with each command of the plurality of commands;
   generate a set of identifiers, wherein each identifier of the set of identifiers identifies a respective logical address range of a plurality of logical address ranges of the memory system, wherein arranging the plurality of commands is based at least in part on the generating;
   arrange the plurality of commands according to an order that is based at least in part on one or more identified patterns of accessing sequential addresses in the plurality of commands;
   transmit the plurality of commands to the memory system based at least in part on the order;
   measure a duration between the memory system beginning to perform a first command of the plurality of commands and the memory system beginning to perform a second command of the plurality of commands, wherein the first command and the second command are performed consecutively; and
   update the set of identifiers and their respective logical address ranges based at least in part on the duration satisfying a threshold.

25. An apparatus, comprising:
   a hypervisor coupled to one or more virtual machines associated with a host system and coupled to a memory system; and
   an Input/Output (I/O) scheduler associated with the hypervisor and configured to cause the apparatus to:
   receive, by the host system and from the one or more virtual machines, a plurality of commands to access the memory system common to the one or more virtual machines;
   store, in a command queue of the host system associated with the memory system, the plurality of commands and a set of parameters associated with each command of the plurality of commands according to a first order;
   arrange, by the host system, the plurality of commands within the command queue from the first order to a second order that is based at least in part on one or more identified patterns of accessing sequential addresses in the plurality of commands; and
   transmit the plurality of commands to the memory system based at least in part on the second order.

* * * * *